(12) United States Patent
Huang

(10) Patent No.: US 10,467,950 B2
(45) Date of Patent: Nov. 5, 2019

(54) I2C TRANSMISSION CIRCUIT AND DISPLAY DEVICE

(71) Applicant: Shenzhen China Star Optoelectronics Technology Co., Ltd., Shenzhen, Guangdong (CN)

(72) Inventor: Xiaoyu Huang, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 109 days.

(21) Appl. No.: 15/500,119

(22) PCT Filed: Jan. 18, 2017

(86) PCT No.: PCT/CN2017/071597
§ 371 (c)(1),
(2) Date: Dec. 21, 2017

(87) PCT Pub. No.: WO2018/010412
PCT Pub. Date: Jan. 18, 2018

(65) Prior Publication Data
US 2018/0211585 A1 Jul. 26, 2018

(30) Foreign Application Priority Data
Jul. 14, 2016 (CN) .......................... 2016 1 0556217

(51) Int. Cl.
G09G 3/20 (2006.01)
G06F 13/40 (2006.01)
(Continued)

(52) U.S. Cl.
CPC ....... *G09G 3/2096* (2013.01); *G02F 1/13452* (2013.01); *G06F 13/4072* (2013.01);
(Continued)

(58) Field of Classification Search
CPC ............... G09G 3/2096; G09G 3/3648; G06F 13/4072; G06F 2213/0016; G02F 1/133514; G02F 1/13452; G02F 1/1368
(Continued)

(56) References Cited

U.S. PATENT DOCUMENTS 5,892,933 A 4/1999 Voltz
2007/0091041 A1* 4/2007 Chung ................... G09G 3/006
345/88

(Continued)

FOREIGN PATENT DOCUMENTS

CN 101140556 A 3/2008
CN 101324875 A 12/2008
(Continued)

OTHER PUBLICATIONS

International Search Report for International Application No. PCT/CN2017/071597, dated Apr. 10, 2017.
(Continued)

*Primary Examiner* — Charles S Chang

(57) ABSTRACT

Disclosed are an I2C transmission circuit and a display device, whereby a technical problem of incorrect writing to an element other than a target element can be solved. The I2C transmission circuit includes a first selection circuit, a second selection circuit, and a selection signal line. An input end of the first selection circuit is connected to a serial clock line, and an input end of the second selection circuit is connected to a serial data line; and the selection signal line is connected to a control end of the first selection circuit and a control end of the second selection circuit.

8 Claims, 2 Drawing Sheets

(51) Int. Cl.
*G02F 1/1345* (2006.01)
*G09G 3/36* (2006.01)
*G02F 1/1368* (2006.01)
*G02F 1/1335* (2006.01)

(52) U.S. Cl.
CPC ...... *G02F 1/1368* (2013.01); *G02F 1/133514* (2013.01); *G06F 2213/0016* (2013.01); *G09G 3/3648* (2013.01)

(58) Field of Classification Search
USPC .......................................................... 349/48
See application file for complete search history.

(56) References Cited

U.S. PATENT DOCUMENTS

| | | | | |
|---|---|---|---|---|
| 2012/0299974 | A1* | 11/2012 | Park | G09G 3/2096 345/690 |
| 2013/0235090 | A1* | 9/2013 | Choi | H05B 33/0827 345/690 |
| 2015/0234452 | A1* | 8/2015 | Heo | G06F 1/3296 713/320 |

FOREIGN PATENT DOCUMENTS

| | | |
|---|---|---|
| CN | 101398801 A | 4/2009 |
| CN | 101763331 A | 6/2010 |
| CN | 103021359 A | 4/2013 |
| CN | 104505038 A | 4/2015 |
| CN | 105404604 A | 3/2016 |
| CN | 105609081 A | 5/2016 |
| CN | 105629602 A | 6/2016 |
| CN | 105761701 A | 7/2016 |
| CN | 105957491 A | 9/2016 |

OTHER PUBLICATIONS

Office Action and Search Report for Chinese Patent Application No. 201610556217.X, dated Feb. 5, 2018.

* cited by examiner

I2C TRANSMISSION CIRCUIT AND DISPLAY DEVICE

CROSS-REFERENCE TO RELATED APPLICATIONS

This application claims the priority of Chinese patent application CN 201610556217.X, entitled "I2C transmission circuit and display device" and filed on Jul. 14, 2016, the entirety of which is incorporated herein by reference.

FIELD OF THE INVENTION

The present disclosure relates to the technical field of display, and in particular, to an I2C transmission circuit and a display device.

BACKGROUND OF THE INVENTION

With development of display technologies, a liquid crystal display screen has become a most common display device. A thin film transistor liquid crystal display (TFT-LCD) device is one of main types of flat display devices currently, and has become an important display device in modern IT and video products.

A main driving principle of a liquid crystal display device is as follows. A system main board connects red, green, and blue compression signals, control signals and drive signals to a connector on a drive circuit board via wires. As shown in FIG. 1, after data is processed by a timing controller (TCON) chip, the data transmits in a drive circuit board 1, and then the data is connected to circuits and elements on an array substrate 4 via a source-chip on film (S-COF) 2 and gate-chips on film (G-COFs) 3 so as to enable the liquid crystal display device to obtain required drive signals and display an image.

In processes of communication within a drive circuit board and communication between the drive circuit board and external elements, an inter-integrated circuit (I2C) protocol is generally used. An I2C is connected to respective elements via serial data lines and serial clock lines so as to realize signal transmission. During actual applications, since all elements are connected to the I2C, incorrect writing or incorrect reading to an element other than a target element is easily caused in an I2C communication process, which affects a normal display effect of the liquid crystal display device.

SUMMARY OF THE INVENTION

The present disclosure aims to provide an I2C transmission circuit and a display device so as to solve a technical problem of incorrect writing to an element other than a target element in an I2C communication process.

The present disclosure provides an I2C transmission circuit, which comprises a first selection circuit, a second selection circuit, and a selection signal line. An input end of the first selection circuit is connected to a serial clock line, and an input end of the second selection circuit is connected to a serial data line. The selection signal line is connected to a control end of the first selection circuit and a control end of the second selection circuit. When the selection signal line is at a low level, the input end of the first selection circuit is electrically connected to a first output end thereof, and the input end of the second selection circuit is electrically connected to a first output end thereof. When the selection signal line is at a high level, the input end of the first selection circuit is electrically connected to a second output end thereof, and the input end of the second selection circuit is electrically connected to a second output end thereof.

Preferably, the first selection circuit comprises a first transistor and a second transistor. The first transistor is an N-channel metal oxide semiconductor (NMOS) transistor, and the second transistor is a P-channel metal oxide semiconductor (PMOS) transistor.

Further, the selection signal line is connected to a gate of the first transistor and a gate of the second transistor, a source of the first transistor and a source of the second transistor are connected to the input end of the first selection circuit; and a drain of the first transistor is connected to the first output end of the first selection circuit, and a drain of the second transistor is connected to the second output end of the first selection circuit.

Preferably, the second selection circuit comprises a third transistor and a fourth transistor. The third transistor is an NMOS transistor, and the fourth transistor is a PMOS transistor.

Further, the selection signal line is connected to a gate of the third transistor and a gate of the fourth transistor; a source of the third transistor and a source of the fourth transistor are connected to the input end of the second selection circuit; and a drain of the third transistor is connected to the first output end of the second selection circuit, and a drain of the fourth transistor is connected to the second output end of the second selection circuit.

The present disclosure further provides a display device. The display device comprises a drive circuit board and an I2C transmission circuit; and an I2C in the drive circuit board is connected to other components via the I2C transmission circuit.

Further, the display device further comprises an array substrate, a color filter substrate, and a liquid crystal layer filled between the array substrate and the color filter substrate.

Preferably, the I2C transmission circuit is formed on the array substrate.

Further, the I2C transmission circuit is arranged at a fan-out area of the array substrate.

Preferably, the I2C in the drive circuit board is connected to the I2C transmission circuit via a chip on film.

The present disclosure has following beneficial effects. The I2C transmission circuit provided in the present disclosure comprises the first selection circuit and the second selection circuit. The input end of the first selection circuit is connected to the serial clock line, and two output ends thereof are configured to transmit a clock signal to different elements. The input end of the second selection circuit is connected to the serial data line, and two output ends thereof are configured to transmit a data signal to different elements.

When the selection signal line is at a low level, the input end of the first selection circuit is only electrically connected to the first output end thereof, and the input end of the second selection circuit is only electrically connected to the first output end thereof. At this time, the clock signal and the data signal are transmitted to a same element via the first selection circuit and the second selection circuit respectively. When the selection signal is at a high level, the input end of the first selection circuit is only electrically connected to the second output end thereof, and the input end of the second selection circuit is only electrically connected to the second output end thereof. At this time, the clock signal and the data signal are transmitted to another element via the first selection circuit and the second selection circuit respectively. Therefore, in the I2C transmission circuit provided herein, the output ends of the first selection circuit and the second selection circuit can be controlled by the selection signal line, so that incorrect writing or incorrect reading in the I2C communication process can be avoided.

Other features and advantages of the present disclosure will be further explained in the following description, and partially become self-evident therefrom, or be understood through the embodiments of the present disclosure. The objectives and other advantages of the present disclosure will be achieved through the structure specifically pointed out in the description, claims, and the accompanying drawings.

BRIEF DESCRIPTION OF THE DRAWINGS

In order to describe technical solutions in embodiments of the present disclosure more clearly, a brief introduction is made to the drawings used in descriptions of the embodiments below. In the drawings.

DETAILED DESCRIPTION OF THE EMBODIMENTS

The implementing manners of the present disclosure will be described in detail with reference to the drawings and embodiments, whereby it can be fully understood how to solve the technical problem by the technical means according to the present disclosure and achieve the technical effects thereof, and thus the technical solution according to the present disclosure can be implemented. It should be noted that, as long as there is no conflict, all the technical features mentioned in all the embodiments can be combined with one another in any manner, and the technical solutions obtained in this manner all fall within the scope of the present disclosure.

Embodiment 1

Figure 1:
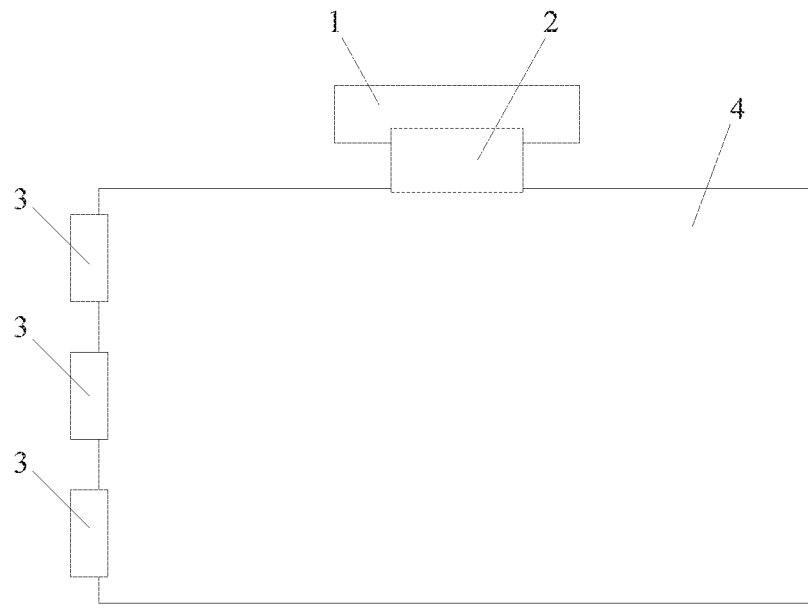
FIG. 1 schematically shows a liquid crystal display device in the prior art.
Figure 2:
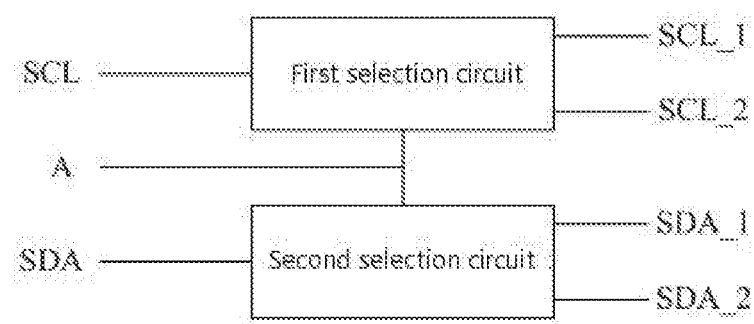
FIG. 2 schematically shows an I2C transmission circuit provided in embodiment 1 of the present disclosure.

As shown in FIG. 2, the present embodiment provides an I2C transmission circuit, which comprises a first selection circuit, a second selection circuit, and a selection signal line A. The selection signal line A is connected to a control end of the first selection circuit and a control end of the second selection circuit.

In the present embodiment, an input end of the first selection circuit is connected to a serial clock line SCL, and a first output end SCL_1 and a second output end SCL_2 thereof are respectively configured to transmit a clock signal to clock signal input ends of two elements. An input end of the second selection circuit is connected to a serial data line SDA, and a first output end SDA_1 and a second output end SDA_2 thereof are respectively configured to transmit a data signal to data signal input ends of two elements. The first output end SCL_1 and the first output end SDA_1 are respectively connected to a clock signal input end and a data signal input end of a first element, and the second output end SCL_2 and the second output end SDA_2 are respectively connected to a clock signal input end and a data signal input end of a second element.

When the selection signal line A is at a low level, the input end of the first selection circuit is electrically connected to the first output end SCL_1 thereof, while the second output end SCL_2 thereof is in an idle state; and meanwhile, the input end of the second selection circuit is electrically connected to the first output end SDA_1 thereof, while the second output end SDA_2 thereof is in an idle state. At this time, the serial clock line SCL and the serial data line SDA are respectively in communication with the first element via the first selection circuit and the second selection circuit so as to transmit the clock signal and the data signal to the first element.

When the selection signal line A is at a high level, the input end of the first selection circuit is electrically connected to the second output end SCL_2 thereof, while the first output end SCL_1 thereof is in an idle state; and meanwhile, the input end of the second selection circuit is electrically connected to the second output end SDA_2 thereof, while the first output end SDA_1 thereof is in an idle state. At this time, the serial clock line SCL and the serial data line SDA are respectively in communication with the second element via the first selection circuit and the second selection circuit so as to transmit the clock signal and the data signal to the second element.

Therefore, in the I2C transmission circuit provided in the present embodiment, the output ends of the first selection circuit and the second selection circuit can be controlled by the selection signal line A, so that incorrect writing and incorrect reading in an I2C communication process can be avoided.

Embodiment 2

The present embodiment provides a display device. The display device can be a large-size display device, such as a liquid crystal television, or a display device having a touch function, such as a mobile phone, a tablet computer, and so on. The display device comprises a drive circuit board and an I2C transmission circuit provided in embodiment 1. An I2C in the drive circuit board is connected to other elements via the I2C transmission circuit.

The display device provided in the present embodiment further comprises an array substrate, a color filter substrate, and a liquid crystal layer filled between the array substrate and the color filter substrate. The I2C transmission circuit can be formed on the array substrate, and the I2C transmission circuit can be formed by a photoetching technology simultaneously with circuit structures such as thin film transistors in an active area. The I2C transmission circuit in the present embodiment can be made by using a complementary metal oxide semiconductor (CMOS) process, and two types of transistor, i.e., PMOS transistors and NMOS transistors, can be made taking advantage of an ultra-high carrier mobility characteristic of low temperature polysilicon (LTPS).

As a preferable solution, the I2C transmission circuit is formed on a fan-out area of the array substrate. The I2C in the drive circuit board can be connected to the I2C transmission circuit via a chip on film, so that an area of the array substrate is not increased by arranging the array substrate.

Figure 3:
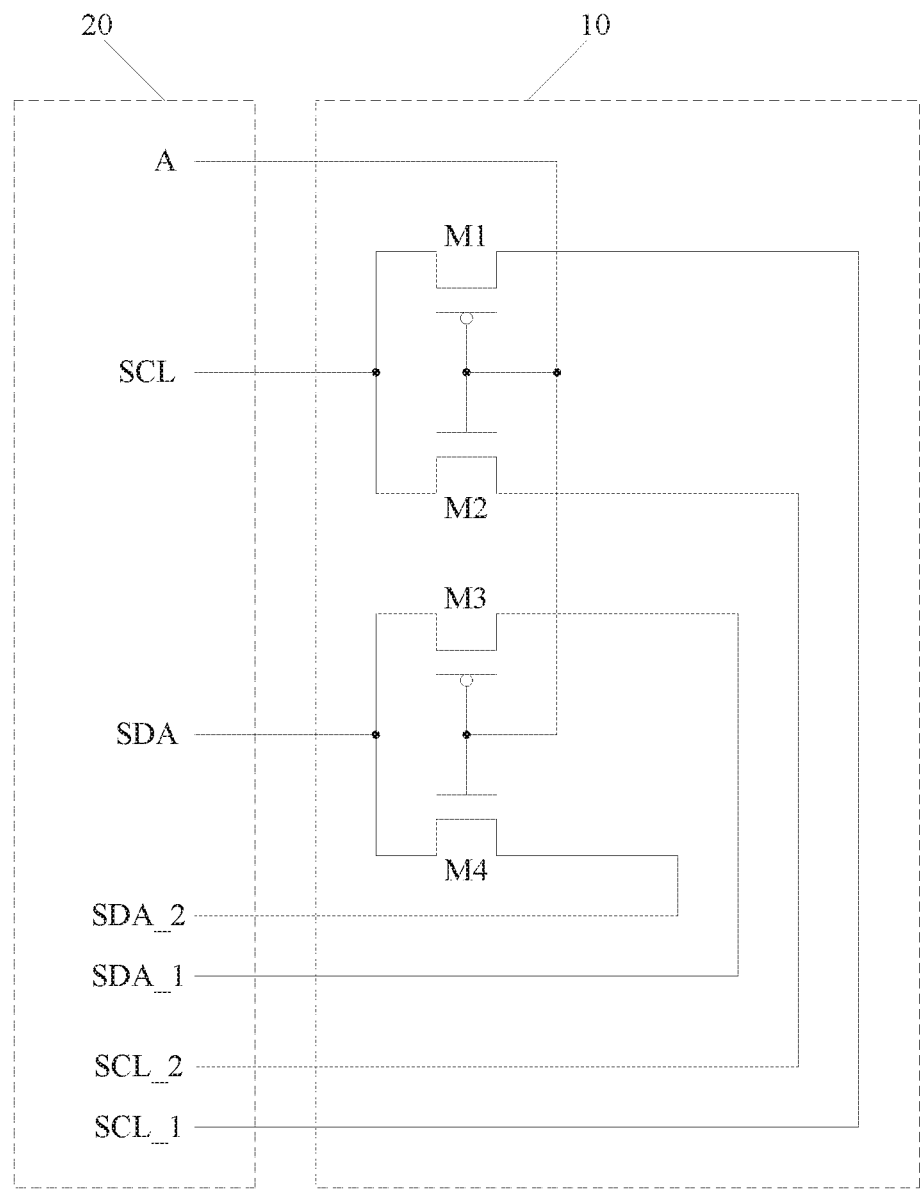
FIG. 3 schematically shows an I2C transmission circuit in a display device provided in embodiment 2 of the present disclosure.

As shown in FIG. 3, in the present embodiment, the I2C transmission circuit is formed on an array substrate 10. A serial clock line SCL and a serial data line SDA are led out from a drive circuit board 20, and a selection signal line A of the I2C transmission circuit is also led out from the drive circuit board 20.

A first selection circuit in the I2C transmission circuit comprises a first transistor M1 and a second transistor M2. The first transistor M1 is an NMOS transistor, and the second transistor M2 is a PMOS transistor. A gate of the first transistor M1 and a gate of the second transistor M2 serve as a control end of the first selection circuit, and are connected to the selection signal line A. A source of the first transistor M1 and a source of the second transistor M2 serve as an input end of the first selection circuit, and are connected to the serial clock line SCL. A drain of the first transistor M1 serves as a first output end SCL_1 of the first selection circuit, and is connected to a clock signal input end of a first element. A drain of the second transistor M2 serves as a second output end SCL_2 of the first selection circuit, and is connected to a clock signal input end of a second element.

The above first element and second element are two different elements. For example, the first element can be a driver of display signals, and the second element can be a driver of touch signals. It can be seen from FIG. 3 that, the first element and the second element in the present embodiment are also arranged on the drive circuit board 20.

A second selection circuit in the I2C transmission circuit comprises a third transistor M3 and a fourth transistor M4. The third transistor M3 is an NMOS transistor, and the fourth transistor M4 is a PMOS transistor. A gate of the third transistor M3 and a gate of the fourth transistor M4 serve as a control end of the second selection circuit, and are connected to the selection signal line A. A source of the third transistor M3 and a source of the fourth transistor M4 serve as an input end of the second selection circuit, and are connected to the serial data line SDA. A drain of the third transistor M3 serves as a first output end SDA_1 of the second selection circuit, and is connected to a data signal input end of the first element. A drain of the fourth transistor M4 serves as a second output end SDA_2 of the second selection circuit, and is connected to a data signal input end of the second element.

When the selection signal line A is at a low level (which is normally 0V), the first transistor M1 in the first selection circuit is turned on, while the second transistor M2 is turned off. In this way, the serial clock line SCL is only electrically connected to the first output end SCL_1 of the first selection circuit. Meanwhile, the third transistor M3 in the second selection circuit is turned on, while the fourth transistor M4 is turned off. In this way, the serial data line SDA is only electrically connected to the first output end SDA_1 of the second selection circuit. At this time, the serial clock line SCL and the serial data line SDA are respectively in communication with the first element via the first selection circuit and the second selection circuit so as to transmit a clock signal and a data signal to the first element and achieve reading and writing to the first element. The serial clock line SCL and the serial data line SDA are not electrically connected to the second element.

When the selection signal line A is at a high level (which is normally 3.3V), the first transistor M1 in the first selection circuit is turned off, while the second transistor M2 is turned on. In this way, the serial clock line SCL is only electrically connected to the second output end SCL_2 of the first selection circuit. Meanwhile, the third transistor M3 in the second selection circuit is turned off, while the fourth transistor M4 is turned on. In this way, the serial data line SDA is only electrically connected to the second output end SDA_2 of the second selection circuit. At this time, the serial clock line SCL and the serial data line SDA are respectively in communication with the second element via the first selection circuit and the second selection circuit so as to transmit a clock signal and a data signal to the second element and achieve reading and writing to the second element. The serial clock line SCL and the serial data line SDA are not electrically connected to the first element.

Therefore, in the display device provided herein, by using the above I2C transmission circuit, the output ends of the first selection circuit and the second selection circuit can be controlled by the selection signal line A, so that incorrect writing and incorrect reading in an I2C communication process can be avoided, which improves reliability of the display device in a display process.

In addition, in the present embodiment, the I2C transmission circuit can be formed by a photoetching technology simultaneously with circuit structures such as thin film transistors in an active area. Therefore, the I2C transmission circuit can be manufactured without increasing production cost of the display device. Therefore, the I2C transmission circuit provided in the present embodiment has a high feasibility.

The above embodiments are described only for better understanding, rather than restricting, the present disclosure. Any person skilled in the art can make any amendments and changes to the implementing forms or details without departing from the spirit and scope of the present disclosure. The protection scope of the present disclosure is determined by the scope as defined in the claims.

The invention claimed is:

1. An I2C transmission circuit, comprising a first selection circuit,
   a second selection circuit, and a selection signal line, wherein:
   an input end of the first selection circuit is connected to a serial clock line, and an input end of the second selection circuit is connected to a serial data line different from the serial clock line;
   the selection signal line is connected to a control end of the first selection circuit and a control end of the second selection circuit;
   when the selection signal line is at a low level, the input end of the first selection circuit is electrically connected to a first output end thereof, while a second output end of the first selection circuit is in an idle state, and the input end of the second selection circuit is electrically connected to a first output end thereof, while the second output end of the second selection circuit is in an idle state; and
   when the selection signal line is at a high level, the input end of the first selection circuit is electrically connected to a second output end thereof, while the first output end of the first selection circuit is in an idle state, and the input end of the second selection circuit is electrically connected to a second output end thereof, while the first output end of the second selection circuit is in an idle state;
   wherein the first selection circuit comprises a first transistor and a second transistor, wherein the first transistor is an NMOS transistor, and the second transistor is a PMOS transistor;
   the selection signal line is connected to a gate of the first transistor and a gate of the second transistor;
   a connection point of a source of the first transistor and a source of the second transistor is connected to the input end of the first selection circuit; and
   a drain of the first transistor is connected to the first output end of the first selection circuit, and a drain of the second transistor is connected to the second output end of the first selection circuit;

wherein the second selection circuit comprises a third transistor and a fourth transistor, wherein the third transistor is an NMOS transistor, and the fourth transistor is a PMOS transistor;

the selection signal line is connected to a gate of the third transistor and a gate of the fourth transistor;

a connection point of a source of the third transistor and a source of the fourth transistor is connected to the input end of the second selection circuit; and a drain of the third transistor is connected to the first output end of the second selection circuit, and a drain of the fourth transistor is connected to the second output end of the second selection circuit.

2. The I2C transmission circuit according to claim 1, wherein the source of the first transistor and the source of the second transistor are directly connected to the input end of the first selection circuit, and the source of the third transistor and the source of the fourth transistor are directly connected to the input end of the second selection circuit.

3. A display device, comprising a drive circuit board and an I2C transmission circuit, wherein the I2C transmission circuit comprises a first selection circuit, a second selection circuit, and a selection signal line, wherein:

an input end of the first selection circuit is connected to a serial clock line, and an input end of the second selection circuit is connected to a serial data line different from the serial clock line;

the selection signal line is connected to a control end of the first selection circuit and a control end of the second selection circuit;

when the selection signal line is at a low level, the input end of the first selection circuit is electrically connected to a first output end thereof, while a second output end of the first selection circuit is in an idle state, and the input end of the second selection circuit is electrically connected to a first output end thereof, while the second output end of the second selection circuit is in an idle state; and when the selection signal line is at a high level, the input end of the first selection circuit is electrically connected to a second output end thereof, while the first output end of the first selection circuit is in an idle state, and the input end of the second selection circuit is electrically connected to a second output end thereof, while the first output end of the second selection circuit is in an idle state;

an I2C in the drive circuit board is connected to other components via the I2C transmission circuit;

wherein the first selection circuit comprises a first transistor and a second transistor, wherein the first transistor is an NMOS transistor, and the second transistor is a PMOS transistor;

the selection signal line is connected to a gate of the first transistor and a gate of the second transistor;

a connection point of a source of the first transistor and a source of the second transistor is connected to the input end of the first selection circuit; and a drain of the first transistor is connected to the first output end of the first selection circuit, and a drain of the second transistor is connected to the second output end of the first selection circuit;

wherein the second selection circuit comprises a third transistor and a fourth transistor, wherein the third transistor is an NMOS transistor, and the fourth transistor is a PMOS transistor;

the selection signal line is connected to a gate of the third transistor and a gate of the fourth transistor;

a connection point of a source of the third transistor and a source of the fourth transistor is connected to the input end of the second selection circuit; and a drain of the third transistor is connected to the first output end of the second selection circuit, and a drain of the fourth transistor is connected to the second output end of the second selection circuit.

4. The display device according to claim 3, further comprising an array substrate, a color filter substrate, and a liquid crystal layer filled between the array substrate and the color filter substrate.

5. The display device according to claim 4, wherein the I2C transmission circuit is formed on the array substrate.

6. The display device according to claim 5, wherein the I2C transmission circuit is arranged at a fan-out area of the array substrate.

7. The display device according to claim 6, wherein the I2C in the drive circuit board is connected to the I2C transmission circuit via a chip on film.

8. The display device according to claim 3, wherein the source of the first transistor and the source of the second transistor are directly connected to the input end of the first selection circuit; and the source of the third transistor and the source of the fourth transistor are directly connected to the input end of the second selection circuit.

* * * * *